July 7, 1970 T. H. HOULE ET AL 3,519,989
MULTIPLE CODE READER SYSTEM FOR AUTOMATIC
CONTROL OF CONTROLLED DEVICES
Filed July 24, 1967 2 Sheets-Sheet 1

INVENTORS
TIM H. HOULE
DONALD J. KOPYDLOWSKI
BY
Andrus & Starke
Attorneys

INVENTORS
TIM H. HOULE
DONALD J. KOPYDLOWSKI
BY
Andrus & Starke
Attorneys 3,519,989

MULTIPLE CODE READER SYSTEM FOR AUTOMATIC CONTROL OF CONTROLLED DEVICES

Tim H. Houle, Wauwatosa, and Donald J. Kopydlowski, Milwaukee, Wis., assignors to A. O. Smith Corporation, Milwaukee, Wis., a corporation of New York Filed July 24, 1967, Ser. No. 655,478
Int. Cl. G06k *5/00;* G06f *11/00;* G08b *11/00*
U.S. Cl. 340—146.1 11 Claims

ABSTRACT OF THE DISCLOSURE

A petroleum dispensing system includes a plurality of punched card code readers, connected in paralleled scanning channels, to control dispensers from different loading stations. Each card reader produces binary output signals related to a binary input code. An electronic scanner provides a series of time-spaced pulse signals which are applied sequentially to the card reader channels to provide an output from a card reader only during the period of the related scan signal. The binary output is applied in common to a plurality of electronic lookout comparing modules. Each of the lockout modules is encoded to a particular code input and produces a lockout signal only if such input is established. An invalid card results in a lockout signal which is applied to a validity checking module or circuit during the period of of the scanning pulse. A validity checking pulse is simultaneously applied to the checking circuit such that overlap between readers is eliminated whereby a invaid card in one reader does not effect the dispenser of the next reader. The validity checking circuit applies a signal in common to a plurality of lockout devices, only one of which is made operative as a result of a signal from the scanner.

This invention relates to a means for sequentially activating a plurality of code means which in turn are connected to control a plurality of controlled means each of which is interconnected and related to only a particular code means.

In control systems for controlled means, it is often desirable to restrict operation thereof to certain personnel or systems. Such a control can be effected by the use of coded means such as the well-known punch card devices, magnetic reading devices, switching devices and the like. Thus, in the dispensing of petroleum products, particularly at bulk loading stations, systems have been recently proposed wherein a truck driver is provided with a coded token or card which permits him to enter a bulk station and directly obtain release of a product or products through the insertion of the code card into a suitable card reader.

A highly satisfactory type of code device is shown in U.S. Pat. 3,328,541 which issued June 27, 1967 to Robert W. Ryno et al. wherein a multiple apertured code card of plastic or the like is inserted and determines which of a plurality of circuits are held open and which are closed. The output of each circuit provides a binary signal into the system. The binary signals are interconnected through a binary code means to provide release of a product to the card holder only if the information corresponds to an authorized punched code card.

A punched card system and the like has the advantage of permitting control of a very substantial number of customers. However, in connection with such a control system, it is often desired to terminate the right of one or more card holders to the use of their card. The coded system therefore desirably includes means to prevent effective operation of one or more particular cards.

The present invention is particularly directed to a reliable and relatively inexpensive means for providing limited lockout of the systems as to certain customer codes, whether the system employs a code card, a manual switching circuit or any other multiple input code system. The system is described with reference to a card system for purposes of clarity of explanation. Applicant has realized that although the overall system may require a very substantial number of customers or personnel each with a unique authorized code, the number to be locked out at any one time practically will always be a very small proportion of such total number of outstanding codes.

Generally in accordance with the present invention, several code or card input readers are interconnected to a plurality of invalid code sensors for the several controlled means. A scanning means is provided to sequentially interconnect the readers to all of the invalid code sensors such that a single lockout circuit can control a substantial number of the card readers. Through the use of electronic scanning means, the time to read and check the several readers is so short that practically immediate control is mentioned at each of the readers. The output of the several lockout modules or sensors, each of which is related to a particular code input, are connected in common to separate lockout devices for the several controlled means.

Each channel of the scanning means includes a separate interlock signal from the scanning device such as to effectively make operable only the lockout device for the controlled means associated with the particular code reader. All of the lockout devices are not actuated in response to an invalid code or card.

Further, due to the very rapid scanning action, there is a possible overlap between scanning control signals which might cause malfunctioning of the system when the devices switch from reading one of the code readers to the next code reader. The present invention provides a validity check gating signal simultaneously applied to the input circuitry of the lockout control devices with the signal from the lockout modules to insure that the system is only operative during an intermediate or central portion of the scanning period. In this way the system is effectively disenabled during the scanning, switching or crossover period from one code reader to the next.

Additional interlocking controls may also be provided to insure the insertion of a code card into or a code into a device before the system can operate the release and to automatically terminate the operation of the control devices when the transaction is terminated.

More particularly as applied to a petroleum dispensing unit and in a preferred embodiment employing the above features as well as others, a plurality of punched card code readers, connected in paralleled scanning channels, provide control of dispensers from different loading stations. Each card reader produces binary output signals related to a binary input code. An electronic scanner provides a series of time spaced pulse signals which are applied sequentially to the card reader channels to provide an output from a card reader only during the period of the related scan signal. The binary output of each reader is therefore only transferred out of the reader during the period of the scan signal. The binary output is applied in common to a plurality of electronic lockout comparing modules. The common connection to all of the modules is permissible because of the sequential scanning of the readers. Each of the lockout modules is encoded to a particular code input and produces a lockout signal only if such input is established. An invalid card results in a lockout signal which is applied to a validity checking module or circuit during the period of the scanning pulse. During a central portion of such scanning pulse, a validity check gating pulse is simultaneously applied to the checking circuit such that an output is established only during the corresponding intermediate portion. This prevents possible overlap between readers whereby an invalid card in one reader may lock out the controlled means of the next reader being scanned. The output from the validity checking circuit is applied in common to a plurality of lockout devices. The operation of the lockout devices is restricted to a particular loading station related to the particular card reader by providing a product release control circuit and simultaneously applying a signal to the release circuit and to the related lockout device from the scanner. An invalid card in fact appears as a valid card until the comparison or validity check signal pulse is established. To prevent operation of the controlled loading station during such period, the operating system frequency is selected such that the time between the start of the scanning pulse and the validity or comparison pulse is less than the time for the release circuit to operate.

In the preferred construction, the system was set up for a three digit identification, each of which digit was encoded to a related binary representation in a code card. To insure that the system does not operate in response to an invalid combination, for example having only two digits, a single comparator module is provided to correspondingly actuate and lock out the system being then read if the input card has less than three digits encoded thereon. The system preferably is provided with an insertion card control whereby the release circuit is not energized unless a card is entered into the reader. The operator terminates a cycle and releases the card by actuating a push button switch or the like which automatically resets the release circuit.

The present invention has been found to provide a high level of security for a coded control system and has been found to be particularly practical and advantageous as applied to a petroleum bulk loading station or the like wherein customer controlled operation of the loading stations is desired while preventing fraudulent or mistaken operation and withdrawal.

The drawings furnished herewith illustrate a preferred construction of the present invention in which the above advantages and features are clearly disclosed as well as others which will be clear from the following description of such drawings.

Figure 1:
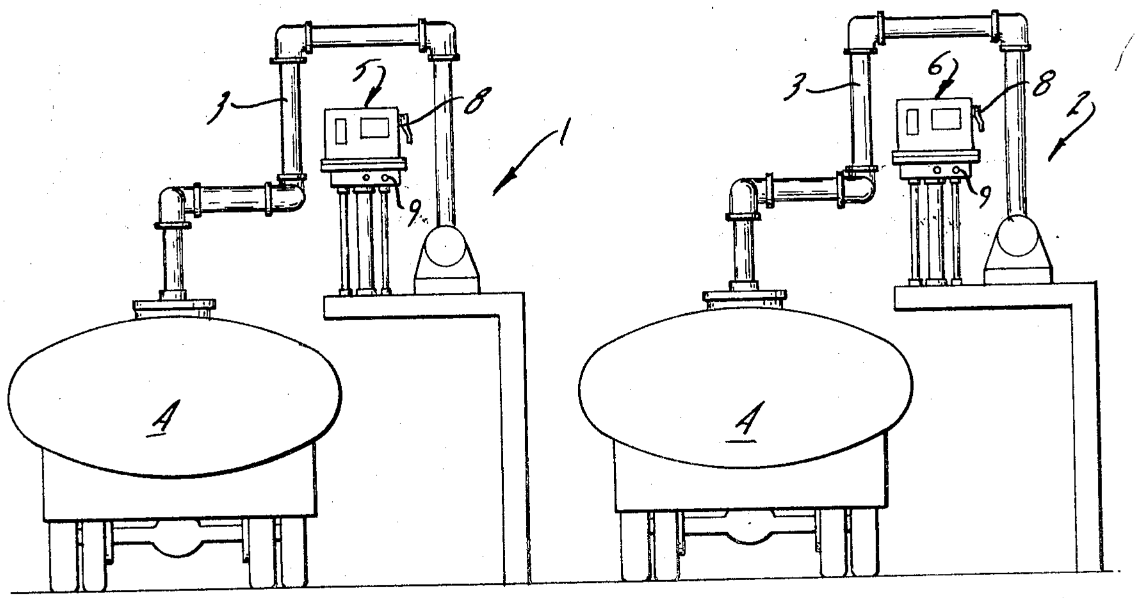
FIG. 1 is a diagrammatic view of a bulk unloading system having a pair of card readers controlling a pair of product dispensing or loading stations.
Figure 2:
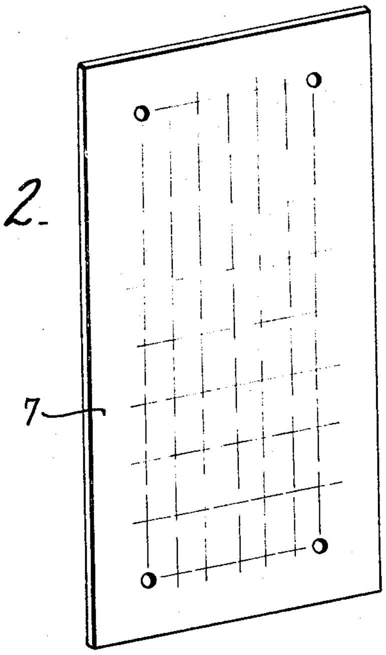
FIG. 2 is a pictorial view of a code card.

Referring to the drawing and particularly to FIG. 1, the present invention is illustrated in connection with a petroleum bulk loading system or plant including a pair of loading stations 1 and 2 having similar dispensing lines 3 for selective discharge of gasoline and other related petroleum products to a tank truck 4 or the like. Each of the dispensing lines 3 at the respective loading stations 1 and 2 is separately controlled by a related card reader 5 and 6 provided at that station. Each of the card readers is similarly constructed to receive a code card 7.

In the illustrated embodiment of the invention, it is assumed that the code card and the card readers employ a punched card wherein the code card 7 is provided with a substantial number of apertures or openings and blanks spaced in preselected array to establish a binary to decimal code system. Insertion of the code card 7 into a card reader 5 or 6 controls the opening and closing of preselected contacts and related circuits to produce a corresponding binary output; for example, as more fully shown in the previously referred to U.S. Pat. 3,328,541.

In the subsequent description, the identification of a card customer is by a three digit decimal number. Within the system such three digit decimal number is represented by a binary code for each digit and thus twelve inputs are required for each code number, four binary representations being required to completely identify the possible demical digit in any one position.

In operation, when an authorized customer enters a loading station 1 or 2, he inserts his particular coded card 7 into the related card reader 5 or 6. If it is a proper card 7, the related loading station 1 or 2 is released and he may withdraw product as desired.

A final release button 9 is provided in readers 5 and 6 to terminate the discharge cycle and to release the code card 7 to the customer. This system is desirable to insure complete recording of the amount if product withdrawn during any particular transaction.

Figure 3:
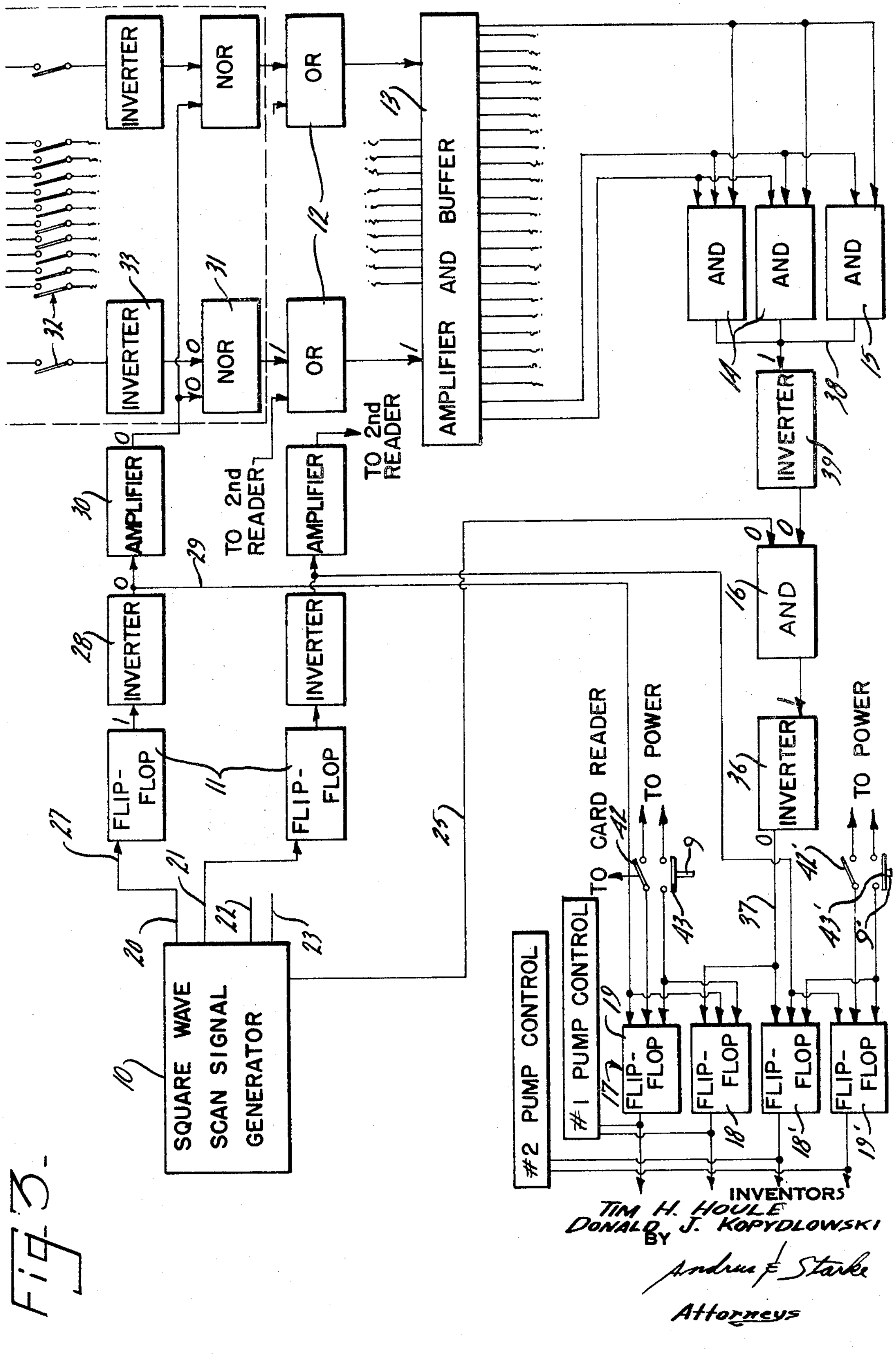
FIG. 3 is a block diagram of the electronic control circuit as applied to the system of FIG. 1.

Referring particularly to FIG. 3, a block diagram of a scanning and lockout system is shown for controlling the discharge system of FIG. 1 and in particular providing a system whereby certain code cards 7 can be locked out or made effectively inoperative. The circuit of FIG. 3 is shown in block diagram as the logic units may be of any known or siutable electronic circuitry units and the details of which would be readily provided by any one knowledgeable in the art of solid state logic controls.

Figure 4:
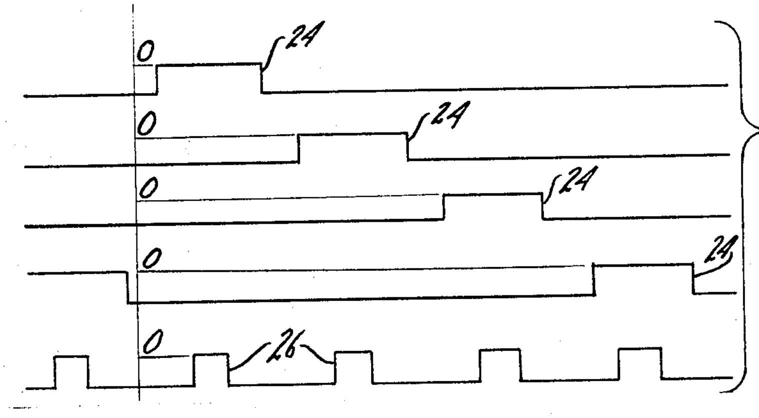
FIG. 4 is a graphical diagram showing the control signals employed in the system.

In FIG. 3, a common scanning generator unit 10 is provided to establish a series of timing pulse signals, such as shown in FIG. 4, which are fed through separate channels each of which includes a scanning gate 11 to sequentially activate the card readers 5 and 6.

The several reader channels which are connected to the scan generator 10 in generally the same manner, are essentially identical and consequently the details of the diagram for the reader 5 are more particularly described hereinafter with the corresponding elements for the channel of reader 6 identified with corresponding primed numbers.

A bank of electronic summing circuits 12 separately interconnect the readers 5 and 6 to a common driver and buffer stage 13 which is employed to convert the input binary signals of the code card into a proper level and signal related to assertions and negations for each binary position. Thus, each binary digit is represented by a zero or a one. In accordance with the present invention, a zero is represented by a given signal from the stage 13 and a one is represented by a different signal. The output of the common driver and buffer stage 13 is connected to a plurality of invalid code or card modules 14 each of which is related to a particular card 7 to be invalidated. Modules 14 provide a lockout signal only if the signal from the reader corresponds to an invalid number set up in any one of the lockout modules 14. The number of lockout modules 14 provided will generally be substantially less than the total number of customer cards which are in use. The system further includes an invalid binary number module 15 having its input connected to the common driver and buffer stage 13 in parallel with the individual lockout modules 14 and has its output similarly connected in common to validity check module 16. The module 15 is responsive to a code card having a non-BCD code combination in any of the three digit combinations employed in the illustrated embodiment of the invention.

The validity check AND gate module 16 is connected to the signal scan generator 10 and limits the effective operation to a central portion of a signal from the modules 14 and 15. This prevents the actuation of the system during the changeover from scanning of one reader to the adjacent reader which might otherwise result in malfunctioning of the system because of the time required for the control system to operate. Although electronic devices may operate in microseconds, such time might be sufficient to cause erroneous functioning because of the rapidity with which the scanning function is established.

The output of the validity check module 16 is connected to a lockout and control assembly 17 for the several loading stations 1 and 2. The assembly 17 includes a plurality of individual lockout modules 18 which have their inputs connected in common to the output of the module 16. Consequently, any invalid card 7 simultaneously applies a lockout signal to the lockout modules 18 for all loading stations 1 and 2 but only the lockout for the loading station related to the card reader being scanned is operative because of the following parts of assembly 17.

The assembly 17 includes a separate release module 19 for each of the loading stations. The related release module 19 and lockout module 18 are interconnected to the output of the scanning gate 11 to receive a signal simultaneously with the application of the scan signal applied to the corersponding reader. The release module 19 is energized by such signal to release the related loading station for operation and the lockout module 18 is conditioned or set to respond to receipt of a signal of an invalid card signal from the module 16. During the reading of the card and the signal transmitted through the system, it appears as though a valid card 7 has been inserted and unloading would be permitted. To prevent operation during this initial timing period or reading period, the system is provided with a frequency in excess of the operating time of the associated loading station control. Consequently, an invalid card signal is received, if an invalid card has been placed in the reader, prior to the release of the loading station and thereby prevent discharge or receiving of any products.

The several components illustrated in the block diagram are generally relativey well-known electronic functioning circuits and devices and consequently no detailed description thereof of each block is given other than to broadly identify the electronic functional capabilities and purpose. The binary logic of the illustrated embodiment of the invention is described with a negative voltage related binary "1" and a zero voltage related to binary "0."

More particularly, the scan generator 10 may be of any suitable construction which can produce a series of time spaced square wave signals at a plurality of output lines 20 through 23. The square wave signals appearing at the lines 20–23 are time-spaced with adjacent or succeeding pulses spaced by one third of the length of each pulse such as shown at 24 in FIG. 4. The illustrated system includes lines 20 and 21 connected to scan readers 5 and 6 and two additional lines 22 and 23 available to control additional readers, if provided. A scan generator 10 with the desired output can be readily formed of a suitable oscillator and flip-flop circuits, for example.

The scan generator 10 further includes a pulse check output line 25 connected to the validity check AND gate module 16. The signal at line 25 is a square wave signal, such as shown at 26 in FIG. 4, which is approximately ⅓ the length of each pulse 24 and occurs during each of the central or intermediate periods of the scanning pulses 24 established at output lines 29.

The scanning gate 11 is a "flip-flop" circuit having a pulse set input terminal 27 connected to the appropriate generator output line 20. A signal inverting logic circuit 28 is connected to the output of the "flip-flop" circuit 11 to provide the proper signal at a signal line 29 which is connected to the product release module 19 of the lockout and control assembly 17 and to a signal matching an amplifier circuit 30, the output of the latter circuit 30 being applied to the related card reader 5. The circuit 30 may be an emitter follower circuit or other similar current gain device.

Card reader 5 includes an input "nor" circuit 31 having a pair of inputs and producing an output only if a logic "0" or no signal appears at both inputs. The "nor" circuit 31 is thus similar to, but responds to the reverse input logic of an "and" circuit, which could be used, wherein a signal output is obtained only if a signal is applied to a pair of inputs.

The card reader 5 is diagrammatically shown as further having a plurality of twelve code switches 32 which are operated by the punched card 7; for example, as shown in the previously referred to U.S. patent. The twelve code switches 32 thus provide a three digit decimal number encoded to a binary code system with four switches being interrelated to identify each of the decimal numbers in the code. The several switches 32 are connected by a signal matching and inverting circuit 33, one to the second input of the two input "nor" circuits 31. As a result, logic zeroes appear at both inputs to the circuit 31 when a valid card 7 is inserted into the card reader 5 and permits closure of the corresponding switch 32.

The output of each "nor" circuit 31 is interconnected as an input to a related two or more input "or" gate 12 which produces an output whenever a signal appears at either one of the inputs. The pair of readers 5 and 6 have the corresponding "nor" circuits 31 connected to a corresponding binary number gate 12. This is permissible as each of the card readers 5 and 6 is operated in sequence and consequently a signal can only appear at one input or the other but not from both readers simultaneously.

Each of the twelve card reader switches 32 therefore produces a corresponding binary logic signal to the driver and buffer stage 13.

The driver and buffer stage 13 is a suitable amplifying and a signal forming circuit which has twleve input lines and twenty-four output lines. Each input line has a pair of related output lines for establishing a positive or assertion signal and a corresponding opposite or negation signal for the binary logic "1" and "0," respectively. One of each pair of output lines of preselected pairs is connected to a corresponding input terminal of the invalid card module 14 to encode an invalid card into the module.

Each of the modules 14 is an "and" logic circuit which includes internal circuit components and connections to produce an output only when a selected three digit binary represented decimal number appears on the inputs to that module 14, for example, to set up a module for the decimal number 963, the module would have to be established with the related binary coding of 0011 for digit 3, 0110 for digit 6 and 1001 for digit 9. This would require proper connection from the buffer stage of the output lines related to the binary numbers 1, 2, 4, 8, 10, 20, $\overline{40}$, $\overline{80}$, $\overline{100}$, $\overline{200}$, $\overline{400}$ and $\overline{800}$, with the bars above a number indicating the "0" or negation logic signal time connection. The related "and" module 14 produces an output signal related to logic zero when a card with the decimal code 963 punched therein was inserted in the card reader 5.

The modules 14 are preferably formed as printed circuit devices with the particular binary number or invalid card number being readily established through simple plug-in type connectors.

The output of all of the "and" modules 14 is connected to a common lead 38 which is connected through a buffer and signal inverting circuit 39 to the validity check module 16.

The check module 16 is a two input "and" logic circuit with the second input connected to the signal or pulse check line 25.

If an invalid card 7 has been inserted in the card reader 5 and the scan signal from the generator 10 has been applied to its "nor" circuit, a corresponding rectangular zero pulse signal appears at the first input of the module 14. During the central third of such signal, a zero validity check gating pulse signal also appears at the second input of the module 16. Consequently, the "and" module 16 limits the effective period of the scanning of the card reader 5 to the central portion thereof for transmitting of a signal to the lockout and control assembly 17 As previously noted, this will prevent overlapping operation as the scanner moves from one card reader to the next.

The output of the module 16 is interconnected through a buffer logic circuit 36 to a common lead 37 which is connected as a corresponding input to each of the lockout modules 18.

Each of the lockout modules 18 is a similar "flip-flop" circuit having its output connected to disable the associated loading station and having its pulse set input interconnected to the output of circuit 36. When an invalid card 7 is inserted in any card reader 5 and that card reader is being scanned, a turn-off or set signal is impressed on all of the "flip-flop" circuits 18 for the several loading stations.

However, each of the flip-flop circuits 18 includes a level set input which must receive a signal before the circuit can be actuated to produce an output signal. In the illustrated embodiment of the invention, the level set terminal is connected to signal line 29 in the related gate channel. Consequently, only lockout module 18 related to the reader 5 is operative during the corresponding period that an invalid signal is transmitted as a result of such reader 5.

Further, this same interlock signal is transmitted to the product release module 19. This module is a corresponding flip-flop circuit having its pulse set input connected to signal line and its output interconnected to permit operation of the loading station. Its level set input is interconnected to a signal source through a switch 42 which is actuated by a card 7 in the related card reader 5 to sense the positioning and locking of the card 7 therein. Until the code card 7 is properly placed in the reader 5 and locked in position, the "flip-flop" circuit of product release module 19 cannot be energized to release the corresponding loading station 1.

Further, the code card 7 must be maintained therein as a result of connecting a pulse reset input for the corresponding "flip-flop" circuit and is connected to a signal source by a reset switch 43 coupled to the release button 9. Thus, when the customer pushes the push button 9 to release his card, a signal is automatically established at the pulse reset input of the related "flip-flop" circuits of modules 18 and 19 which resets them to the initial condition.

The invalid binary code combination module 15 is a similar "and" module having its input connected to the output line of the driver and buffer stage. If a code card with any or all of the three digits having a non-BCD code combination is inserted into the card reader, the module 15 produces an output signal which results in a corresponding lockout of the corresponding loading station 1.

The operation of the present invention is briefly summarized as follows, particularly with respect to FIG. 3. The customer positions his truck adjacent a loading station. Before inserting his code card 7 into the card reader 5, he positions the loading line 3 with respect to his truck. Certain interlock switching may be actuated by proper positioning of the line 3 to insure that the line is properly placed for discharging of the product into the truck. Such detail will be obvious to those skilled in the art and has not been shown in the drawing.

The code card 7 is placed into the card reader 5 and lever 8 moved to the read position. This automatically sets the switches or contacts 32 in accordance with the encoding of the code card. During this period, the generator 10 provides continuous scan signals to the card reader in timed sequence and when the encoding signal is applied to the related card reader 5 the corresponding binary signals are transmitted via the "or" gates 12 to the driver and buffer stages 13. The output of the driver and buffer stage 13 appears as a corresponding binary code with an assertion signal related to each one of the input binary signals and a negation signal appearing at each of the related input zeros. The corresponding signals are applied to all of the "and" modules 14 and if the card 7 is an invalid card, an appropriate signal is transmitted to the validity check "and" module 16. During the central portion of this signal, a check gating signal is simultaneously applied to the circuits 16 and permits transmission of a signal to the lockout modules 18. Only that circuit or module 18 related to the loading station 1 for the reader 5 however is active as a result of the simultaneous application of the scanning signal at the line 29 to the level set input of the "flip-flop" circuit 18. Once the release circuit is set, it remains in that state until such time as a signal is applied to the reset input. This is established only from the end of transaction push button 9 which simultaneously resets the product release module 19 and the lockout module 18.

The present invention has been found to provide a reliable and inexpensive security control for a coded control system and particularly to such a system wherein a very substantial number of customers are to be controlled while only a limited number of such customers can be anticipated as to require operative disconnect of their particular coded card.

We claim:

1. A coded control system having a plurality of similar code input means each of which controls and is related to at least one separate controlled means in response to any one of a plurality of permissive code inputs to the code input means, comprising a plurality of invalid code means each of which is encoded to a particular one of said permissive code inputs and defining invalid code inputs, scanning means to sequentially connect said code input means to said invalid code means to produce a lockout signal in response to the presence of any one of the invalid code inputs in a code input means, control means connecting the invalid code means to the controlled devices and including interlock means connected to said scanning means to disable only the controlled device related to the code input means having the invalid code inputs.

2. The coded control system of claim 1 wherein said scanning means generates scanning signals of a predetermined time separated by a second predetermined time, and validity pulse source means to establish a validity pulse of a shorter period than said first predetermined time during essentially the central portion of the signal, and validity check means inserted between said invalid code means and said control means and connected to the validity check pulse source to transmit a signal from said invalid code means only during the time of the validity pulse.

3. The coded control system of claim 1 wherein said scanning means generates scanning signals of a predetermined time separated by a second predetermined time at inputs to said code input means and a validity check signal of a shorter period than said first predetermined time during essentially the central portion of each of said scanning signal at a validity check line, and a dual logic input circuit having a first input connected to said validty check line and a second input connected to said invalid code means to transmit a disable signal to the control means only during the time of the validity pulse.

4. The coded control system of claim 1 wherein said code input means are punched card readers for receiving any one of a plurality of similar cards, each of which includes a code identified by a decimal number and encoded in binary logic, invalid code means encoded in a corresponding binary logic, electronic gate means connecting said card readers to said invalid code means, said scanning means being connected to activate said gate means.

5. The coded control system of claim 1 wherein said scanning means generates a series of signals to said code input means to establish the connection to the invalid card means, said means connecting the invalid card means to the controlled devices includes a dual input switch for each device, a first input of each switch being connected in common to the invalid code means, and said interlock means includes connection of the second input of each dual input switch to the scanning means and receiving a signal simultaneously with the signal to the corresponding code input means.

6. A coded control system having a code input means controlling a controlled device in response to any one of a plurality of permissive code inputs, comprising an invalid code means encoded to a particular one of said permissive code inputs defining an invalid code input, a release means for said device having a selected operating time, means to periodically connect said input means to said invalid code means for a selected time less than the said operating time to produce a lockout signal in response to the presence of said invalid code input and to simultaneously actuate said release means, and means connecting said invalid code means to the controlled devices to disable the device.

7. In a coded control system having a plurality of code input means, each of which is capable of actuating a related one of a plurality of controlled means, the improvement in the connection therebetween comprising, scanning means generating control signals and sequentially and cyclically impressing said control signals on said code input means and conditioning said code input means to produce a code related output in accordance with the code input established in the input means, a plurality of lockout devices, each of said devices being related to a particular one of the code related outputs and establishing a selected signal in response to said code, a control release means for the controlled means and responsive to insertion of a code in a related reader and a related scanning signal to release the related control means, and an overriding control means for said controlled means and connected to said lockout means for disabling the related control device, said overriding control means being connected to said scanning means to restrict effective operation of the overriding control means to the controlled means related to the activated code input means.

8. In a coded control system having a plurality of binary code card readers having a plurality of control switch means aligned with code input portions of a card, each of which is capable of actuating a related one of a plurality of controlled means, the improvement in the connection therebetween comprising, a dual input logic circuit having a first input connected to said switch means, scanning means generating scan signals and sequentially and cyclically impressing said scan signals on the second input of said dual input logic circuit and setting said input logic circuit to transmit a signal in response to simultaneous application of related signals to said two inputs, a plurality of invalid code modules connected to the logic circuit and being related to a particular one of the binary codes and interconnected to a common line and establishing a selected signal in response to transmission of said code from a reader, dual input logic lockout circuits, one for each of said controlled means having a first input connected to said common line and having a second input connected to said scanning means to restrict effective operation of the dual input logic circuits to the one controlling the controlled means related to the activated code reader.

9. The coded control system of claim 8 having second dual input logic circuits one for each of the controlled means and responsive to the presence of a code card in a related reader and a simultaneously established related scanning signal to release the related controlled means.

10. The coded control system of claim 8 having multiple input "or" logic circuits connected to each of the first named dual input logic circuits, a buffer stage connected to said "or" logic circuits and having a plurality of output lines including paired lines related to the assertion and negation of a binary signal for each of said "or" logic circuits, said lockout modules being connected to said output lines.

11. The coded control system of claim 8 wherein said scanning means further generates a validity check signal of a shorter period than said scanning signals and during essentially the central portion of each scanning signals, and validity check means inserted between said invalid code modules and said lockout circuits to transmit a signal to the lockout circuits only during the time of the validity pulse.

References Cited

UNITED STATES PATENTS

| | | | |
|---|---|---|---|
| 3,039,582 | 6/1962 | Simjian. | |
| 3,184,714 | 5/1965 | Brown et al. | |
| 3,255,339 | 6/1966 | Rausing | 235—61.7 |
| 3,394,246 | 7/1968 | Goldman | 235—61.7 |

EUGENE G. BOTZ, Primary Examiner

R. S. DILDINE, Jr., Assistant Examiner

U.S. Cl. X.R.

235—61.7

UNITED STATES PATENT OFFICE
CERTIFICATE OF CORRECTION

Patent No. 3,519,989 July 7, 1970

Tim H. Houle et al.

It is certified that error appears in the above identified patent and that said Letters Patent are hereby corrected as shown below:

Column 1, line 30, "a invaid" should read -- an invalid --. Column 2, line 46, "the", second occurrence, should read -- to --. Column 4, line 16, "if" should read -- of --; line 24, "siutable" should read -- suitable --; line 43, "signal" should read -- signals --; line 61, "of" should read -- any or all of --. Column 5, line 14, "corersponding" should read -- corresponding --; line 30, "relativey" should read -- relatively --. Column 6, line 25, "twleve" should read -- twelve --; line 42, "1", "2" and "20" should read -- 1 --; -- 2 --; -- 20 --; line 43, "80", "200", and "400", respectively, should read -- 80 --, -- 200 --, and -- 400 --; line 69, after "17" insert a period. Column 8, line 43, after "validity" cancel "check"; same line 43, after "source" insert -- means --; line 68, "card", each occurrence, should read -- code --.

Signed and sealed this 27th day of October 1970.

(SEAL)
Attest:

EDWARD M.FLETCHER,JR.
Attesting Officer

WILLIAM E. SCHUYLER, JR.
Commissioner of Patents